(12) United States Patent
Mech

(10) Patent No.: US 7,733,354 B1
(45) Date of Patent: Jun. 8, 2010

(54) ANTI-ALIASED RENDERING

(75) Inventor: Radomir Mech, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 482 days.

(21) Appl. No.: 11/756,522

(22) Filed: May 31, 2007

(51) Int. Cl.
G09G 5/00 (2006.01)
G06T 17/00 (2006.01)
G09G 5/02 (2006.01)
G06K 9/00 (2006.01)
G06K 9/40 (2006.01)
G06K 9/32 (2006.01)

(52) U.S. Cl. .................. 345/589; 345/428; 345/606; 345/611; 345/619; 382/162; 382/254; 382/266; 382/300

(58) Field of Classification Search .......... 345/418, 345/421–422, 426, 428, 581, 586, 589, 600, 345/606, 626, 611, 614, 618–619, 643, 660, 345/549, 630; 382/162, 164, 165, 167, 173, 382/254, 266, 274, 276, 283, 300, 279
See application file for complete search history.

(56) References Cited

U.S. PATENT DOCUMENTS

| 7,280,119 | B2 | 10/2007 | Leather et al. | |
| 7,280,121 | B2 | 10/2007 | Nakahashi et al. | |
| 2007/0165035 | A1* | 7/2007 | Duluk et al. | 345/506 |

* cited by examiner

Primary Examiner—Wesner Sajous
(74) Attorney, Agent, or Firm—Fish & Richardson P.C.

(57) ABSTRACT

Methods, systems and apparatus, including computer program products, for anti-aliased rendering. A plurality of objects is received. Each object in the plurality of objects is depth-ordered. Each object is rendered from back to front into a plurality of pixels. Each pixel in the plurality of pixels has a respective color value. The rendering includes selecting an object from the plurality of objects. Respective alpha values are determined for first pixels in the plurality of pixels based on coverage of the first pixels by the selected object. The respective color value of each of the first pixels is attenuated based on the respective alpha values. The respective color value of each of the first pixels is added to based on the respective alpha values and one or more color properties associated with the selected object.

28 Claims, 8 Drawing Sheets

ANTI-ALIASED RENDERING

BACKGROUND

The present disclosure relates to anti-aliased rendering of objects.

Modern graphics processing engines that are used to render a set of primitives typically have a mode in which anti-aliasing is performed during rendering of the primitives.

Anti-aliasing, sometimes called anti-aliased rendering, is achieved by allocating N color buffers and rendering each primitive N times to the buffers. For any particular pixel, the N color values of the pixel specified in the N buffers represent N samples derived by rendering the set of primitives. To produce the anti-aliased image, where each pixel has a single color value, the N buffers are averaged together. This technique works well but requires a lot of memory, particularly when the desired number of samples is large. Since each buffer is completely rendered, the technique also demands significant memory bandwidth.

Alternatively, a buffer of size S×N may be used, where S is the size of the desired image. Using this buffer, N neighboring pixels (organized in a square pattern and therefore applicable when N is a power of two) correspond to a single pixel in the desired image. The scene is rendered once into this large buffer, where each object in the scene covers N times as many pixels as it would in the desired image. Every N pixels of the large buffer are averaged to obtain one anti-aliased pixel in the desired image. Using this technique, the required memory is also (N+1)×S, the buffer itself, plus another buffer for the desired image.

SUMMARY

This specification describes technologies relating to anti-aliased rendering.

In general, one aspect of the subject matter described in this specification can be embodied in methods that include the actions of receiving a plurality of objects. Each object in the plurality of objects being depth-ordered. The plurality of objects is partitioned into groups of two or more objects. Each pair of objects in a group of objects share a common edge. Each group of objects is depth-ordered based on the depth of an object in the group. Each group of objects is rendered from back to front into a plurality of pixels. Each pixel in the plurality of pixels has a respective color value. The rendering includes selecting a group of objects from the groups of objects. Respective first alpha values are determined for first pixels in the plurality of pixels based on coverage of the first pixels by objects in the selected group of objects. The respective color value of each of the first pixels is attenuated based on the respective first alpha values. Each object in the selected group of objects is rendered, where this rendering includes selecting an object from the selected group of objects. Respective second alpha values for second pixels in the plurality of pixels are determined based on coverage of the second pixels by the selected object. The respective color value of each of the second pixels is added to based on the respective second alpha values and one or more color properties associated with the selected object. Other embodiments of this aspect include corresponding systems, apparatus, and computer program products.

These and other embodiments can optionally include one or more of the following features. Determining coverage of the first pixels by objects in the selected group of objects can include super-sampling each pixel of the first pixels to determine a proportion of each pixel being covered by an object in the selected group. The proportion can be stored as a respective alpha value of each pixel. Attenuating the color value of each of the first pixels can include multiplying the respective color value of each of the first pixels by one minus the respective first alpha values. Multiplying the respective color value of each of the first pixels by one minus the respective first alpha values can include adjusting the first alpha values based on a respective transparency property associated with an object in the selected group of objects. The first pixels can be identified based on an inner boundary area and an outer boundary area of the selected group of objects. The second pixels can be identified based on an inner boundary area and an outer boundary area of the selected object. The wide area of the selected group can be dynamically adjusted based on changes to the size of the selected group with respect to the plurality of pixels. An inside area of each object in the selected group of objects can be rendered. The inside area can correspond to third pixels in the plurality of pixels where each of the third pixels are completely covered by a single object in the selected group of objects. The rendering can blend the respective color values of each of the third pixels based on a respective color property and a respective transparency property of the single object.

In general, another aspect of the subject matter described in this specification can be embodied in methods that include the actions of receiving a plurality of objects. Each object in the plurality of objects is depth ordered. Each object is rendered from back to front into a plurality of pixels. Each pixel in the plurality of pixels has a respective color value. The rendering includes selecting an object from the plurality of objects. Respective alpha values are determined for first pixels in the plurality of pixels based on coverage of the first pixels by the selected object. The respective color value of each of the first pixels is attenuated based on the respective alpha values. The respective color value of each of the first pixels is added to based on the respective alpha values and one or more color properties associated with the selected object. Other embodiments of this aspect include corresponding systems, apparatus, and computer program products.

These and other embodiments can optionally include one or more of the following features. Determining coverage of the first pixels by the selected object can include super-sampling each pixel of the first pixels to determine a proportion of each pixel being covered by the selected object. The proportion can be stored as a respective alpha value of each pixel. The first pixels can be identified based on an inner boundary area and an outer boundary area of the selected object. An inside area of each object in the plurality of objects can be rendered. The inside area can corresponding to second pixels in the plurality of pixels being completely covered by the selected object. The rendering can blend the respective color values of each of the second pixels based on a respective color property and a respective transparency property of the selected object. Attenuating the respective color value of each of the first pixels and adding to the respective color value of each of the first pixels can be effected in a single composite blending operation.

Particular embodiments of the subject matter described in this specification can be implemented to realize one or more of the following advantages. Only a fraction of video memory is needed to render an anti-aliased image compared to conventional anti-aliasing techniques. Anti-aliased images of objects can be rendered under severe memory constraints, particularly where memory space is not sufficient to store multiple intermediate renderings or when memory bandwidth is limited. No depth buffer is required. Despite using much less memory, an anti-aliased image can be rendered very quickly compared to conventional approaches. The amount of memory bandwidth needed during rendering can be less compared to conventional anti-alias rendering approaches. The speed of the technique can be improved if some artifacts in the rendered image are tolerated.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
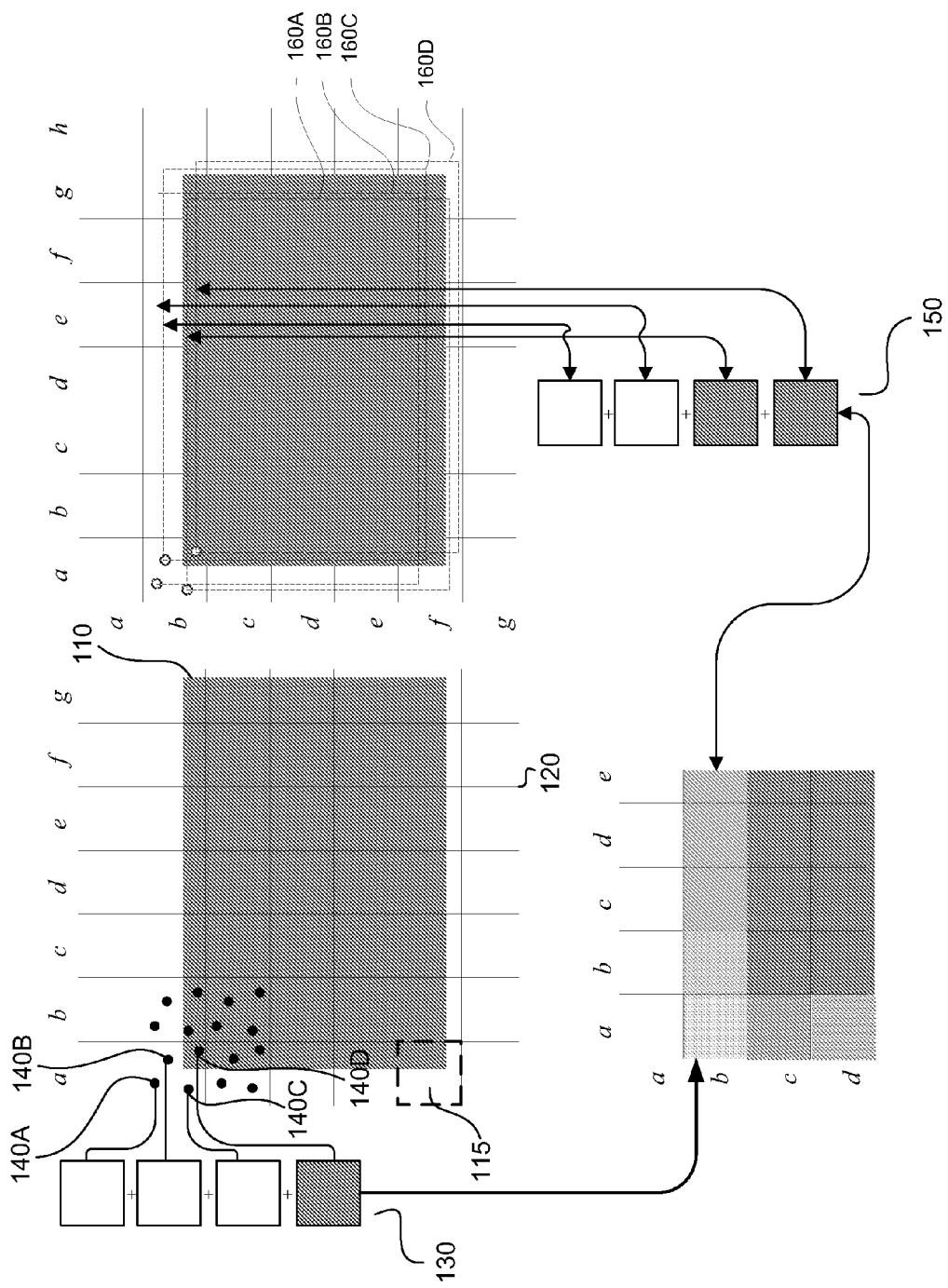
FIG. 1 illustrates super-sampling and jittering techniques used for anti-aliased rendering.

FIG. 1 illustrates super-sampling and jittering techniques used for anti-aliased rendering. Generally, with respect to computer graphics, anti-aliased rendering refers to the process of transforming a high-resolution continuous geometric object 110 into a lower-resolution, typically discrete, representation (e.g., a raster of pixels seven pixels wide (a-g) and seven pixels high (a-g)). Geometric objects include points, lines, triangles, polygons and other shapes derived from those objects such as, two dimensional surfaces (e.g., a mesh or parametric curve) or three-dimensional volumes.

The lower-resolution representation is frequently specified as an array of pixel values, which is sometimes referred to as a raster image or color buffer. The raster image is typically generated for presentation on a display device or output on a printing device. A grid 120 illustrates the boundaries of an element (e.g., pixel) of the representation. During rendering, pixels in the raster are colored to produce a representation of the objects. The location of the object 110 is shown superimposed over the grid 120 illustrating the ideal image of the object. Turning on or off, or otherwise affecting the color of each individual pixel will at best generate an approximate image of the object. For example, the pixel 115 is neither completely covered nor uncovered by the object. Turning the pixel 115 on over-represents the object, while turning it off under-represents the object. If the object were rasterized conventionally (e.g., without anti-aliasing), then effectively only pixels where the center of the pixel are covered by the object are affected. Anti-aliased rendering generates pixel values that more closely approximate the ideal appearance geometric objects compared to conventional rasterization.

The value of a pixel generally refers to the color value of the pixel in a color space. The color value of a pixel can be specified in a various color spaces, for example, RGB (red, green, blue), CMYK (cyan, magenta, yellow, cyan) or Grayscale. The value of the pixel can also include an alpha transparency value which can be used when rendering pixels. In general, the alpha values of pixels can be stored in an alpha buffer apart from the colors of each pixel (i.e., the color channel), or, alternatively, can be stored with the color values of each pixel (e.g., as the alpha component of an RGBA (red, green, blue, alpha) encoded pixel value).

When an object is rendered to a raster image using conventional rasterization, the color of any pixel covered by the object is blended according to the color properties of the object (e.g., the color and transparency of the object). When the same object is rendered to the same raster image using anti-aliased rendering, the color value for a pixel is determined at multiple varying locations within the pixel. For example, the sample points 140A-D are positioned in different locations within the pixel (a, b). Notice that only point 140D is covered by the object 110. In the representation, the anti-aliased color value of pixel (a, b) is the average of the color values 130 for each sample (e.g., points 140A-D). Thus, the pixel (a, b) is approximately 25% (e.g., one out of four samples) covered by the object and so the pixel color is blended with 25% the color of the object 110. This technique is referred to generally as super-sampling.

Super-sampling can be achieved by conventionally rasterization the object multiple times, each time adjusting the position of the object by a very small amount. The outlines 160A-D each represents the position of the object 110 after each adjustment. Each time the position of the object is changed (i.e., jittered) the object is rasterized to a separate raster of pixels. Thus, for N samples, the image is rasterized into N buffers. For a given pixel, the color value of the pixel given in each buffer is averaged together 150 to generate a color value for the pixel in the final raster image. This technique is referred to as jittering or jittered rasterization and is a type of super-sampling because multiple sample values are determined for each pixel in the representation 120. Although FIG. 1, illustrates super-sampling and jittering where four samples are determined for each pixel, the particular sample size depends on the particular implementation. Typical sample sizes include, for example, two, four, eight, or 16 samples per anti-aliased pixel.

Figure 2:
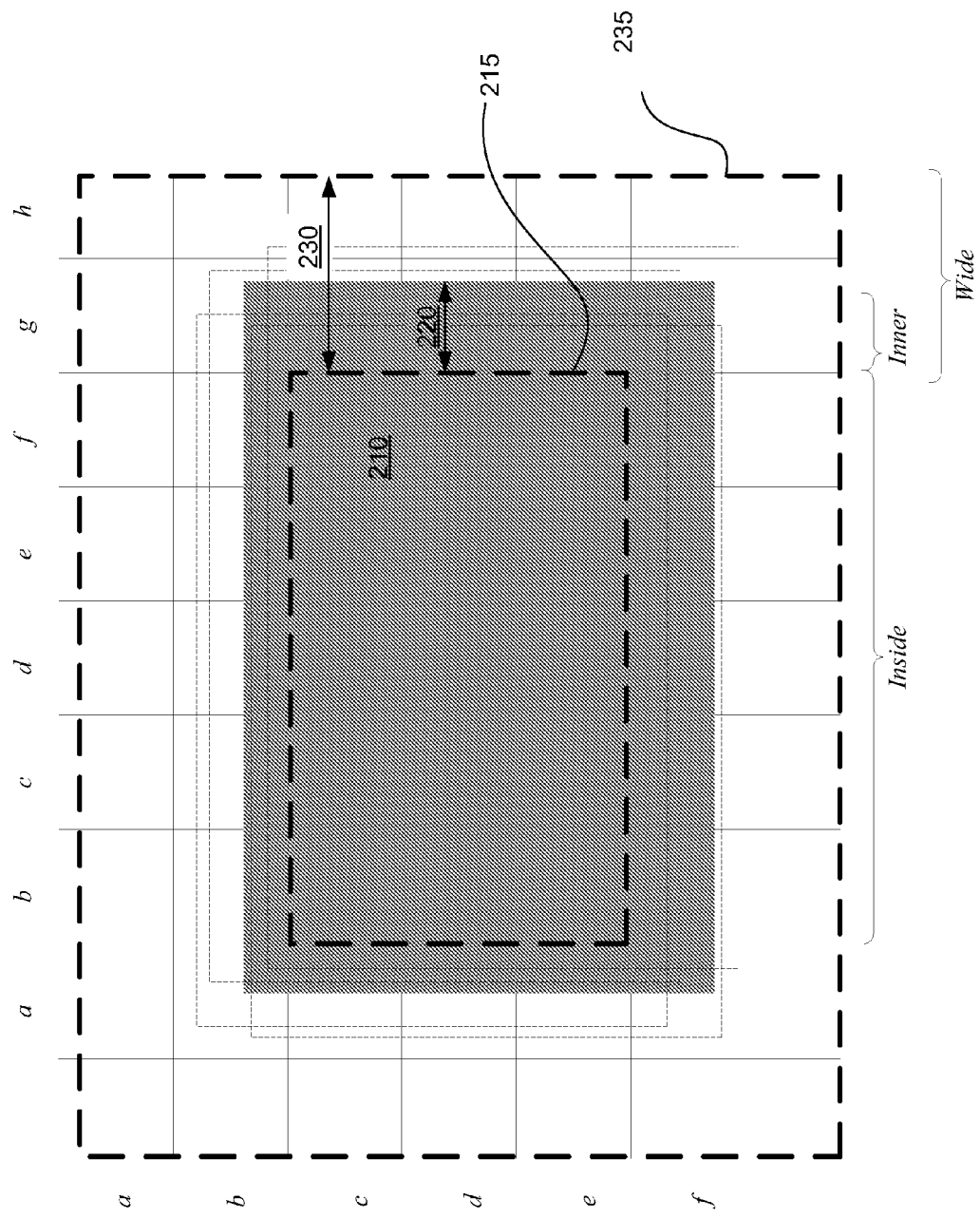
FIG. 2 shows the inside, inner and wide area of an object.

FIG. 2 shows an inside area 210, an inner area 220 and a wide area 230. The inside area 210 of an object corresponds to the pixels in the raster image that are completely covered by the object and are not affected by anti-aliasing. The inside area 210 of the object shown in FIG. 2 is shown delimited by the boundary 215. The color value of pixels of the inside area 210 of the object correspond to the color of the object (if the object is opaque) and can be determined by conventional rasterization. The inner area 220 of an object is an area between the edge of the object and the object's inside area 210. In some implementations, the inner area 220 can include all of the object's inside area 210—in such implementations the inside area 210 and the inner area 220 are the same and correspond to the pixels covered or partially covered by the object. The wide area 230 of an object is an area between the inner area 220 of the object, if any, and an outside boundary 235 located beyond the edge of the object. The wide area 230 minimally includes all possible pixels whose values can be affected by anti-aliasing. In other words, the wide area 230 includes any pixels intersected by the edge of the object or any of the object's jittered positions.

Figure 3:
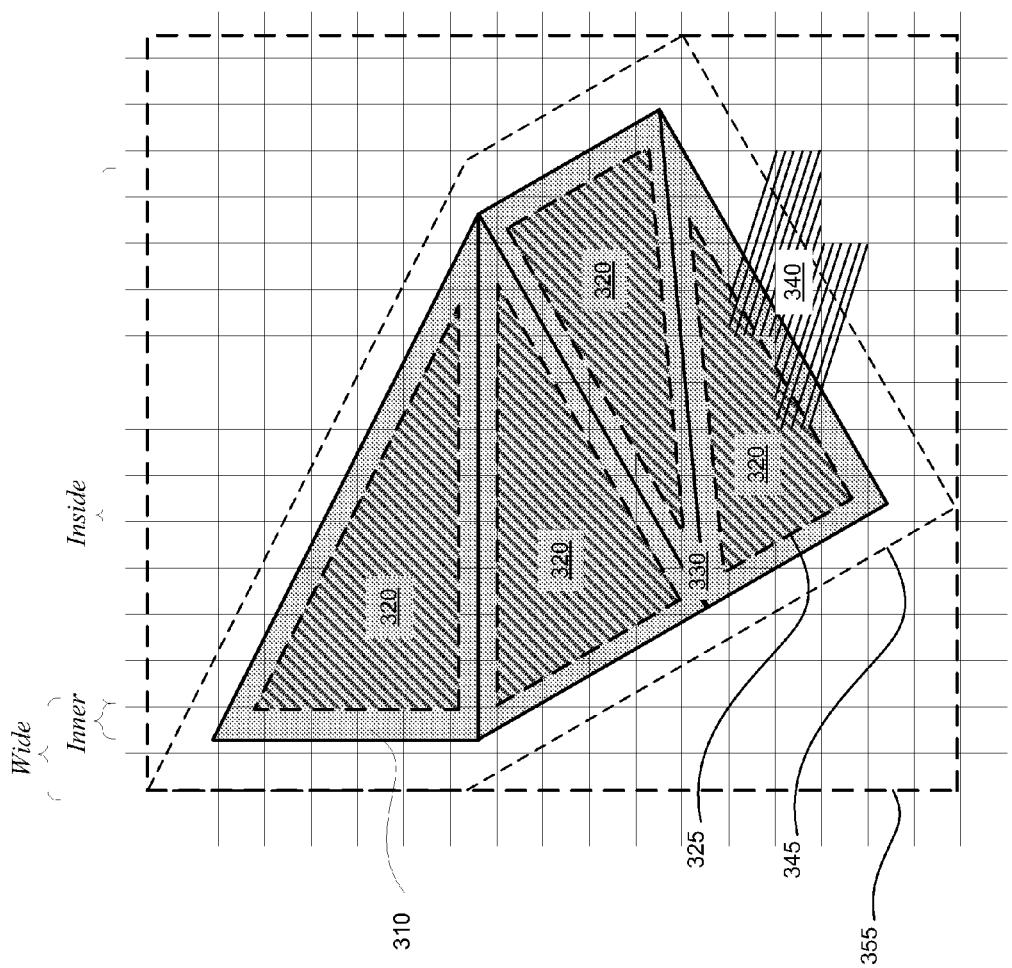
FIG. 3 is a diagram of a group of objects.

The size of an object's areas can vary among implementations. Typically the inner area 220 of an object is at least a one pixel-wide area that includes any pixel intersected by the object's edge 215. The wide area 230 of an object includes the object's inner area 220 as well as, minimally, any pixel intersected by any jittered adjustment of the object. Alternatively, the wide area 230 includes areas outside the object. For example, the wide area 230 of an object can be bounded by a bounding box around the object, even, for example, if the object is not rectangular. In some implementations, particularly when the object's size changes over time (e.g., during animation), the object's wide area 230 can be determined and re-determined whenever the object's size or position, in pixels, change. Alternatively, the wide area 230 of an object can defined to be large enough to cover a range of object sizes. In some implementations, the size of the wide area 230, or any other object area, can be determined dynamically based on the current size of the object FIG. 3 is a diagram of a group of objects 310. In general, the image to be rasterized can include multiple objects (e.g., polygons). These objects are partitioned into groups of two or more objects. The objects are partitioned such that each pair of objects in a group of objects share a common edge. For example, the group of objects 310 is a polygon mesh that includes four triangle objects that each share a common edge with another triangle in the group. Generally, if a first object overlaps a second, then the first will be in one group while the second with be in another group.

A group of objects, as if treated as a single object, has an inside area, an inner and a wide area. For example, the inside area 320 of the group of objects 310 includes the inside area of each object. Analogous to a single object, the group of objects 310 has an inner area 330 and a wide area 340. The inner area 330 includes the inner area of each object in the group. The minimal wide area 340 is delimited by the inner boundary 325 and the outer boundary 345. In an alternative implementation, the outer boundary of the wide area 340 is determined by a bounding box 355. The hashes over the area 340 indicate which pixels are covered or partially covered by any of the jittered rasterization of the group of objects.

Figure 4A:
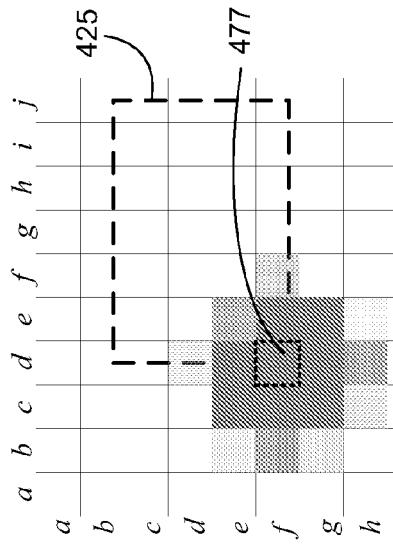
FIG. 4A is a diagram of two objects superimposed on a raster of pixels.
Figure 4B:
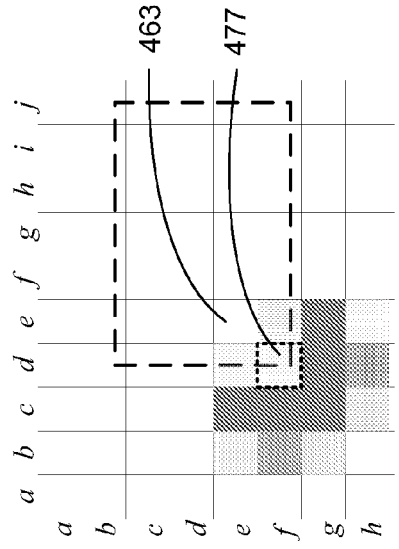
FIG. 4B is a diagram of a circle already rendered to the raster of pixels.
Figure 4C:
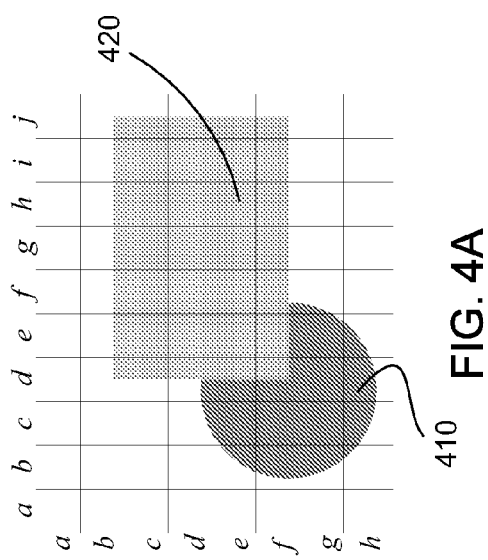
FIG. 4C is a diagram of alpha values of pixels covered by a rectangle.
Figure 4D:
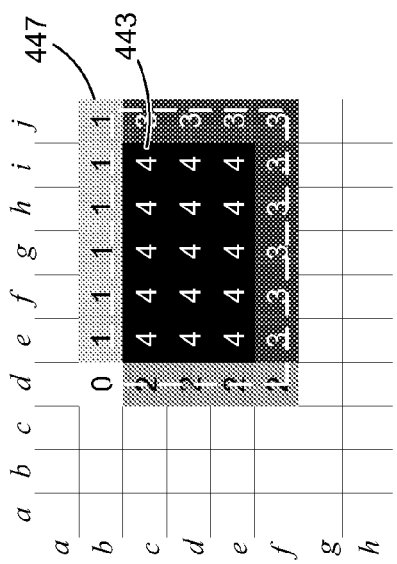
FIG. 4D shows attenuation of color from the raster of pixels using the alpha values shown in FIG. 4C.
Figure 4E:
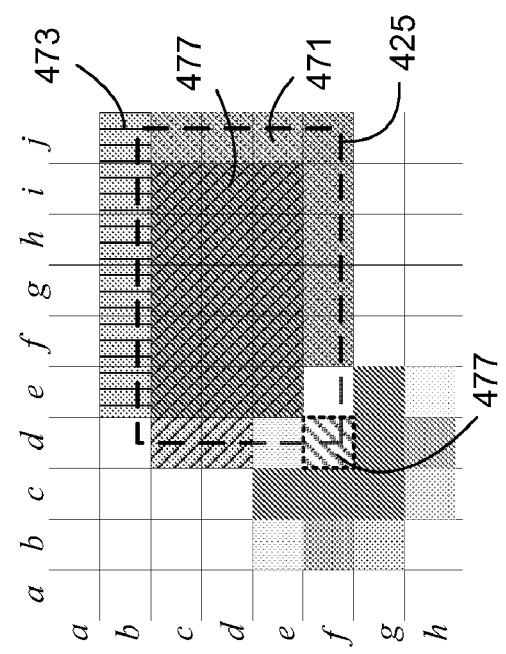
FIG. 4E shows the addition of color to the pixels covered by the rectangle.

The following discussion in reference to FIGS. 4A-4E illustrates an overview of anti-aliased rendering that uses only a raster of pixels where each pixel has a color value and an alpha value. At the end of the rendering the raster of pixels contains the final rendered image and so the size of the buffer need only have as many pixels as the desired image. The scene to be rendered to the raster includes multiple objects that have a depth-wise ordering, as described in reference to FIG. 4A. Based on the depth-wide ordering the objects are rendered back to front, as shown in FIG. 4B. When several objects are rendered back to front, the object that has the lowest depth order (e.g., the object below all other objects) is rendered first, then the next lowest object is rendered and so on until the objects are rendered. To render a given object, alpha values are determined for pixels that the object completely or partially covers, as shown in FIG. 4C. These alpha values are determined by a jittered rasterization of the object. Using these alpha values the object's color is blended with the existing color of each pixel covered or partially covered by the object. The blending can be represented as attenuating pixels (i.e., reducing the existing color of pixels), as shown in FIG. 4D, and as adding color to the pixels (i.e., adding the object's color to the pixels), as shown in FIG. 4E. Further details of each aforementioned step are described in more detail in reference to each respective figure. Further special handling is provided when objects share edges, as described in reference to FIG. 6.

FIG. 4A is a diagram of two objects superimposed on a raster of pixels. A first object, a circle 410, is shown overlapped by a second object, a rectangle 420. In general, each object can correspond to a single object or to a group of objects. The objects are shown in their ideal geometric dimensions compared to the grid of discrete pixels comprising the raster of pixels onto which the objects are rendered. The follow describes how the rectangle 420 is rendered to the raster of pixels using anti-aliased rendering.

FIG. 4B is a diagram of a circle 410 already rendered to the raster of pixels. The outline 425 corresponds to the location of the rectangle with respect to the raster of pixels. In various implementations, groups of objects are rendered back to front (e.g., according to transparency layers) and therefore the values of each pixel correspond to the color of objects that have already been rendered. The circle 410 is rendered completely to the raster of pixels, despite the fact that part of the circle will be partly covered by the overlapping rectangle 420. Some of the pixels covered by the circle are only partially covered and thus those pixels are set to have only partially the color of the circle. The pixel 477 is completely covered by the circle and is set to have a color value the same as the color value of the circle. In some implementations, objects in the scene that are completely covered by other opaque objects can be culled and omitted from consideration during rendering.

FIG. 4C is a diagram alpha values of pixels covered by a rectangle 420. The alpha value of a pixel represents the proportion of the pixel covered by an object being rendered. Generally, each alpha value has a range between zero and a maximal value (e.g., 0.0-1.0 or 0-255). The alpha value can conveniently be considered a value between zero and one, representing a proportion of coverage where one represents complete coverage (e.g., the maximal alpha value). The alpha values of pixels are used in subsequent operations, particularly for blending pixels covered by the object (e.g., a pixel 25% covered by an object is blended with 25% the color of the object). Note that the alpha value of the pixel is a property of the pixel and is separate from a transparency value of the object.

To determine the alpha value of a pixel, super-sampling is used to determine how much of the pixel is covered by an object. The object can be jitter rasterized such that each time the object is rasterized, any alpha value of pixel covered by the object is increased in proportion to the total number of samples. For example, the alpha value of a pixel is increased by 1/N with each N samples where the pixel is covered by the object. In such implementations, the maximal alpha value is dependent on the sample size of the super-sampling. In any case, the maximal alpha value indicates that the pixel is completely covered by the object (e.g., all of the samples inside of the pixel were covered by the object). Thus, the alpha value of a pixel in the raster shown in FIG. 4C is the proportion of the pixel covered the rectangle 420 as determined by anti-aliased super-sampling of the rectangle 420 with respect to the raster of pixels.

For example, the alpha value of the pixel 433 shown in FIG. 4C has a maximum value of four (out of a total of four samples) indicating that the pixel is completely covered by the object. The alpha value indicates the number of samples in the super-sample which the object covers (e.g., 5 out of 8 samples represent 62.5% coverage). The alpha value of the pixel ideally estimates the proportion of the pixel covered by the object. The pixel 443, completely covered by the rectangle has an alpha value of four representing complete coverage.

The pixel 447 has an alpha value of one, indicating that the object covers approximate 25% of the pixel or that only one out of four super-samples is covered by the object.

FIG. 4D shows attenuation of color from the raster of pixels using the alpha values shown in FIG. 4C. When a pixel's color is attenuated, the color $c'_i$ of the pixel i can be expressed using the following expression $c'_i = c_i \times (1-\alpha_i)$, where $c_i$ is the previous color (e.g., the color of the pixel before attenuation) of the pixel and $\alpha_i$ is the alpha value of the pixel expressed as a value between zero and one. In some implementations, the object is rasterized to the color buffer to identify the pixels covered or partially covered by the object. In any case, the color value of each pixel is attenuated in proportion to the coverage of current object, as given by each pixel's associated alpha value. For example, the color of pixel 463 is attenuated completely because the pixel is completely covered by the rectangle 420, according to the pixel's alpha value. The color of pixel 477, in contrast, is attenuated by only 50% because the pixel has an alpha value of two out of four. In some implementations, wherein the object being rasterized has a transparency value, the color of a pixel is attenuated in proportion to both coverage and transparency. For example, if the rectangle had a transparency of 50%, then the color of pixel 463 would be attenuated by only 50% and the color of pixel 467 by 25%.

After the color of a pixel covered by the current object has been attenuated, color corresponding to the color of the current object is added to the pixel. Adding color to the pixels sets the color of the pixel by blending the current color of the pixel with the color of the object. The blending is based on the pixel's alpha value, which can be expressed as the following blending function: $c'_i = c_i + (c_j \times \alpha_i)$, where $c_i$ is the current color of pixel i, $\alpha_i$ is the pixel's alpha, $c_j$ is the color of the object and $c'_i$ is the new blended color of the pixel.

FIG. 4E shows the addition of color to the pixels covered by the rectangle, the location of which is illustrated by the outline 425. The pixels 477 have a color value the same as the color of the rectangle itself because the alpha value of the pixels indicate that the pixels are completely covered by the rectangle. The color of pixels 471 is set to be 75% (e.g., 3 out of 4 samples, as indicated by the alpha value of the pixels) of the color of the rectangle. Similarly, the pixels 473 are set to have a color the same as the color of the rectangle weighted by the alpha value of the pixels 473. In other words, the color of the pixels 473 is set to be 25% of the color of the rectangle. The colors of the pixels 473 and the pixels 471 assume that these pixels had no previous value (e.g., they had a zero color value). In contrast, the color of pixel 477, which has color value, is blended with the color of the rectangle weighted by the alpha value of pixel 477. Recall that the color value of the pixel 477 after attenuation is set to 50% the color of the circle. After adding the color of the rectangle to the pixel, the color of the pixel is 50% the color of the circle and 50% the color of the rectangle.

In some implementations, the attenuation and addition of color to a pixel is accomplished in single composite blending operation. In particular, such a blend operation can be specified in particular rendering systems (i.e., hardware accelerated video devices) that are typically accessible by application programming interface such as OpenGL® or DirectX®.

In some implementations, each object is associated with an inner area, as described in reference to FIG. 3. In such implementations, rendering an object can begin by rasterizing the inside area of the object. The inside area can be rasterized conventionally (e.g., without super-sampling) since the pixels covered by the inside area are all completely covered. Subsequent operations, determining alpha values, attenuating and adding color, can be limited to pixels in the object's wide area which does not include the inside area. The alpha values of the object can be determined by jitter rasterization of the inner area of the object. Likewise, attenuating and adding color can be accomplished by rasterizing the inside area, or alternatively, processing (e.g., performing attenuation and addition operations) all pixels in the object's wide area.

In some implementations, objects are associated with a transparency value specifying whether the object is semi-transparent. Transparency $t_j$ of an object j can be expressed as a value between zero and one, indicating the object's relative proportion of transparency. During attenuation, if a pixel i is covered by an object with a transparency value, the color $c_i$ attenuated by the pixel is further proportional to the transparency value of the object (e.g., $c'_i = c_i \times (1-\alpha_i \times t_j)$). If the object has a transparency value, then the amount of color added is likewise further weighted by the transparency of the object (e.g., $c'_i = c_i + (c_j \times \alpha_i \times t_j)$).

The example illustrated in FIGS. 4A-E assumes that the object being rendered, the rectangle 420, is a single object. In general, all the objects of a scene can be rendered in this fashion, however, in some cases undesirable visual artifacts may appear in the final image.

Some of the most noticeable artifacts are those that occur when the edge of two objects cover the same pixel, which often occurs when two objects share a common edge. For example, the rectangle 420 can be a group of objects where, for example two right triangles share an edge and form a representation of a rectangle. The artifacts that appear are described in reference to FIG. 5. To avoid some of these undesirable artifacts, groups of objects are rendered in a slightly modified manner, as described in reference to FIG. 6.

The rendering of the group of objects is similar to that of a single object, except that color attenuation occurs first for all objects in the group (e.g., all colors of pixels covered by the group are attenuated). Then, each object in the group is rasterized to the color buffer in turn to add color. Details of rendering groups of objects are described further in reference to FIG. 6.

The separate operation of first attenuating a pixel's color and then blending the color of the pixel in a subsequent operation, as already described, is necessitated by the case wherein two (or more) objects cover the same pixel, but neither of the two objects covers the pixel completely. Such is generally the case for the common edges between pairs of objects in a group of objects. For a given pixel covered by a first and a second object, the color of the pixel is blended with the color of the first object when the first object is rasterized. Subsequently, when rasterizing the second object, the color of the pixel, which has already been affected by the previous blending, is blended with the color of the second object. As each object is rasterized in turn, only the pixel's color and the proportion of color of the current object to add are known. Without first attenuating the color value of the pixel there would be no way to determine what part of the pixel's color is the pixel's original color (e.g., before the rendering process started) and what part is the color of the other object (e.g., the blended color of another object rasterized to the same pixel). The following diagram illustrates the problem.

Figure 5:
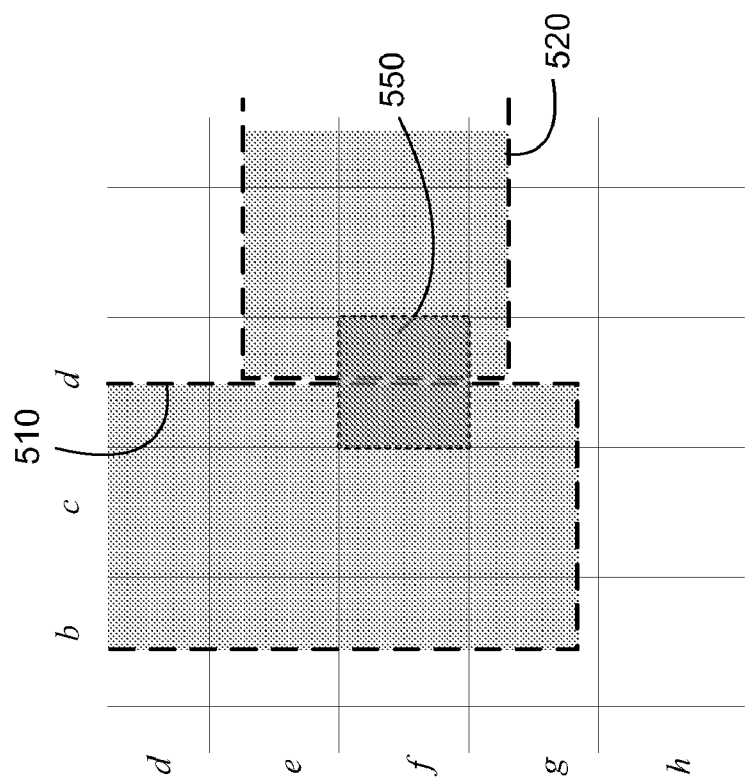
FIG. 5 is a diagram of a pixel covered by two objects.

FIG. 5 is a diagram of a pixel 550 covered by two objects, the first object's location indicated by the outline 510, the second object's location represented by outline 520. The following illustration presumes that the first object is red and covers 50% of the pixel 550. The second object is blue and also covers 50% of the pixel. The previous color of the pixel 550 is green. When rasterized, clearly the correct color value of the pixel 550 is blend of 50% red (the color of the first object) and 50% blue (the color of the second object). If the pixel 550 is rasterized directly without first attenuating the color of the pixel, then the color of the pixel after rasterizing the first object would be a blend of 50% green (the pixel's previous color) and 50% red. After rasterizing the second object, the first object would be a blend of 25% green, 25% red (the pixel's previous color) and 50% blue—the wrong result. By attenuating color from the pixel 550 first, the color of the pixel 550 is set have a zero color value (e.g., the result of attenuating 100% of the pixel's color because the pixel is completely covered by the group). Later, when rasterizing each object of the group in turn, the color of pixel 550 is set to be 50% red after rasterizing the first object. After rasterizing the second object, the color of the pixel 550 is set to 50% red and 50% blue—the desired value.

Figure 6:
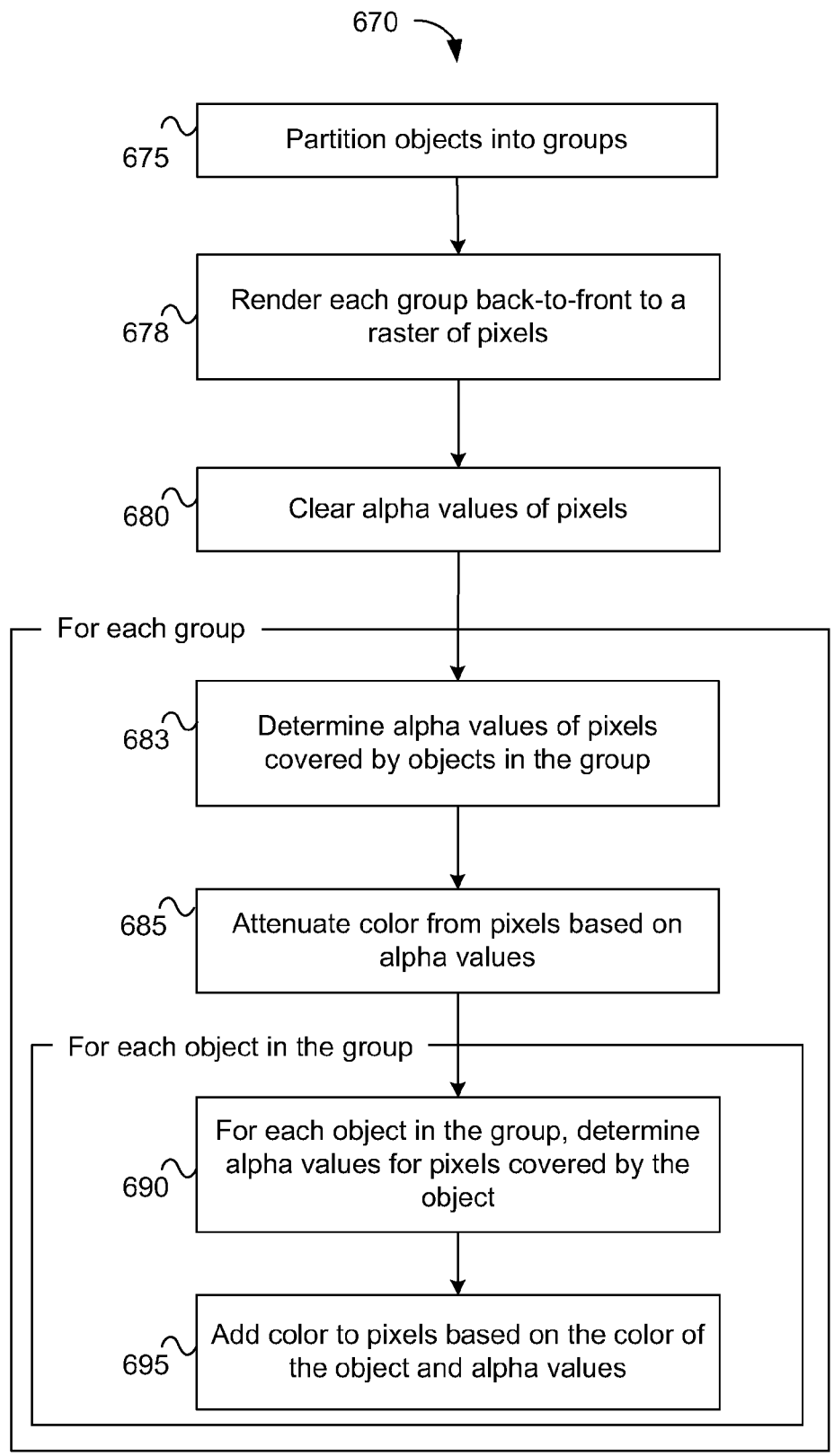
FIG. 6 is a flow diagram of a process for rendering groups of objects to a raster of pixels.

FIG. 6 is a flow diagram of a process 670 for rendering groups of objects to a raster of pixels, where the raster stores color values of a plurality of pixels. In general, the process 670 assumes that no inner boundary has been established for each object or each group of objects. In some cases, however the following discussion describes how the process can be altered if an inner boundary for an object is available.

The process 670 partitions the objects to be rendered into groups (step 675). The objects are partitioned so that all objects in a group of objects share at least one common edge. Each group of objects has a depth value, which can be used to order the group with respect to other groups of objects. The depth value of a group is based on the depth value of objects in the group. Objects are associated with a depth value indicating the relative order of each object with respect to other objects. If the depth value of a first object indicates that it overlaps another object, the first object will occlude part of the object it overlaps, namely any area shared by both objects. When objects in a group of objects do not all share the same depth value, the depth value of the group can be based on an average of the depth values of all objects in the group or, alternatively, a minimum depth value among all the objects in the group.

Each group is rendered back to front to a raster of pixels (step 678). The raster of pixels is a plurality of pixels that, in some implementations, corresponds to the frame buffer of a video display device. In other implementations, the plurality of pixels represents an image that is being rendered for subsequent processing (e.g., storing to a file) before being displayed. If an inner boundary is available, the inside area of each object in the group can be conventionally rasterized to the raster of pixels. The inside area of each object completely covers pixels in the raster and therefore these pixels are not affected by anti-aliasing.

The system clears the alpha values of pixels covered by the group of objects (step 680). In some implementations, the alpha values of all pixels are cleared. In other implementations, alpha values are cleared based on a bounding box or a KDOP (k-discrete oriented polytope) that covers the group of objects. In yet other implementations, where the inside boundary of a group of objects is available, the alpha values of pixels covered by the wide area of the group are cleared.

The process 670 determines alpha values for pixels covered by objects in the group (step 683). The alpha values are determined using a super-sampling technique. For example, using the jittering technique, each jittered rasterization of the object adds 1/N to the alpha value of pixels covered by the jittered object in that rasterization. At the end of the jittered rasterization, the alpha value of each pixel represents the anti-aliased coverage of pixels by the object. For example, an alpha value ranges between zero and one, zero representing coverage of the pixel in none of the jittered renderings and a value of one representing coverage of the pixel in all of the jittered renderings. In some implementations, where an inner boundary is available, the inner area (but not the inside area) of each object in the group is rendered using jitter rasterization to determine the alpha values for pixels covered or near an object edge.

Using the alpha values, the process 670 attenuates color from each pixel in the raster of pixels (step 685). Color is attenuated from a pixel in proportion to coverage of the pixel as indicated by the pixel's alpha value. Color attenuation is further proportional to the transparency value of the object. Note that in the case that two objects in the group cover the same pixel and the two objects do not have the same transparency value, then the transparency value of only one object is used in the attenuation. Although this will give slightly incorrect results, in practice this practice will not produce noticeable artifacts.

In some implementations, the colors of the pixels are attenuated by rasterizing each object in the group in turn, attenuating the color of any pixel covered by the object. As each object is rasterized the alpha values of pixels that are rasterized are cleared. This prevents reducing pixel values more than once for pixels that are covered by more than one object (e.g., pixels covered by common edges shared by objects in the group). Instead of clearing alpha values for each object in turn a depth buffer is used, in some implementations.

Having attenuated pixels in the raster, the process 670 continues by processing each object in the group separately from one another. Given an object in the group alpha values are determined for pixels covered by the object by itself (step 690). The alpha values are determined by a jitter rasterization of each object. This is similar to step 683 except that alpha values are only determined for one object at a time. In some implementations, where an inner boundary is available, the inner area of each object is rendered using jitter rasterization. Before jitter rasterization of the object, the alpha values of pixels covered by the object are cleared.

The process 670 adds color to pixels covered by the object based on the alpha values (step 695). As described above, color is added to a pixel based on the color of the object and the alpha value of the pixel, as well as the transparency value of the object if any.

Figure 7:
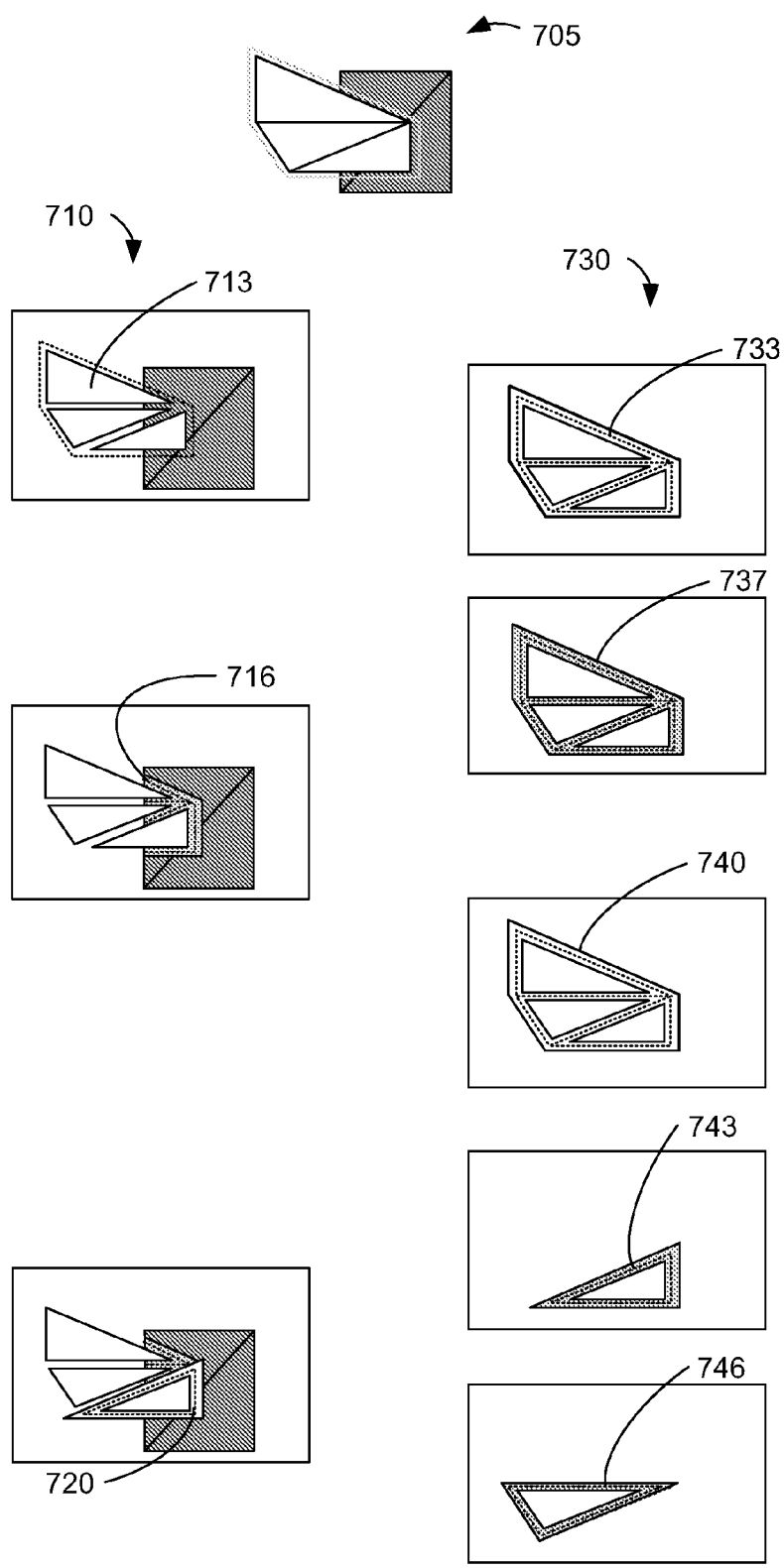
FIG. 7 illustrates how objects are rendered to a plurality of pixels.

FIG. 7 illustrates how objects 705 are rendered to a plurality of pixels. The objects 705 include two triangles used to represent a square and three other triangles used to represent a polygon. A raster of pixels 710 is shown multiple times representing color values of the plurality of pixels as the rendering progresses. Similarly, an alpha buffer 730 is shown representing the alpha values of each pixel at various points during the rendering process. The rendering process illustrated presumes that inner boundaries are available (or have been determined) for each object and group of objects. All pixels except those of the square are presumed, in this example, to have had no color and therefore attenuation of color has no effect on those pixels.

The system partitions the objects into groups. The triangles representing the square are grouped together to form a group of objects, while the other triangles representing the polygon are grouped together to form another group of objects. The square, being under the polygon according to the respective depth value of each group, has already been rendered. The remaining discussion describes rendering the group of objects representing the polygon.

The system renders the inside area 713 of each object in the group. The dotted line indicates the edge of the group of objects. Pixels covered by the inside area 713 are completely covered and so rasterization of the inside area sets the color of covered pixels by blending the pixels' previous color values with the color value of the object. The blending is based on the object's transparency, but not on any alpha value since these pixels are completely covered and their alpha values would be maximal.

Alpha values (in the alpha buffer 730) of pixels under the respective wide area 733 of the group of objects is cleared. In general, the other areas of the alpha buffer do not matter as subsequent operations assume the inner area of the objects are already rasterized, thus affecting at most the pixels of the wide area.

The system determines the alpha values 737 for pixels in the wide area of the group of objects. These alpha values can be determined by jitter rasterization of the inner area of the group of objects. The alpha values 737 affect how much color is attenuated from pixels in the wide area 716. The colors of the pixels are attenuated by rasterizing the wide area of each object in the group, the rasterization is used to determine which pixels are covered (even partly covered) by the object, those pixels are subject to color attenuation. Attenuation of color is also based on the transparency value of the object, as already described. After this operation, the raster of pixels, if presented, would depict the inner area of each object 713, and some pixels 716, which used to be colored the color of the square, are now faded having had their colors attenuated. The wide area 716 is shown only as it intersects with the colored rendering of the square. In general the entire wide area of the group of objects is used to attenuate color, but since all other pixels covered by the wide area were already without color, those pixels are not shown. As the wide area of each object in the group is rasterized to attenuate color, the corresponding alpha values for the object's wide area are cleared. Thus, after all of the objects have been rasterized in this manner, the alpha values of the pixels 740 are clear.

Then, for each object in the group of objects, the system determines the alpha value of pixels covered by the object's wide area. The area 743 represents the determined alpha values for the first object in the group. These alpha values are used when rasterizing the wide area of the first object to the raster of pixels. The rasterization causes color to be added to pixels in the area 720. Color is added to these pixels according to the respective alpha values (e.g., represented by area 743) of those pixels. If the object has a transparency value, then the amount of color added is also affected by the transparency value of the object.

The alpha values of pixels in the area 743 are cleared, and the process continues for each remaining object in the group (e.g., alpha values are determined for area 746 covered by the next object in the group) and any remaining groups of objects.

Figure 8:
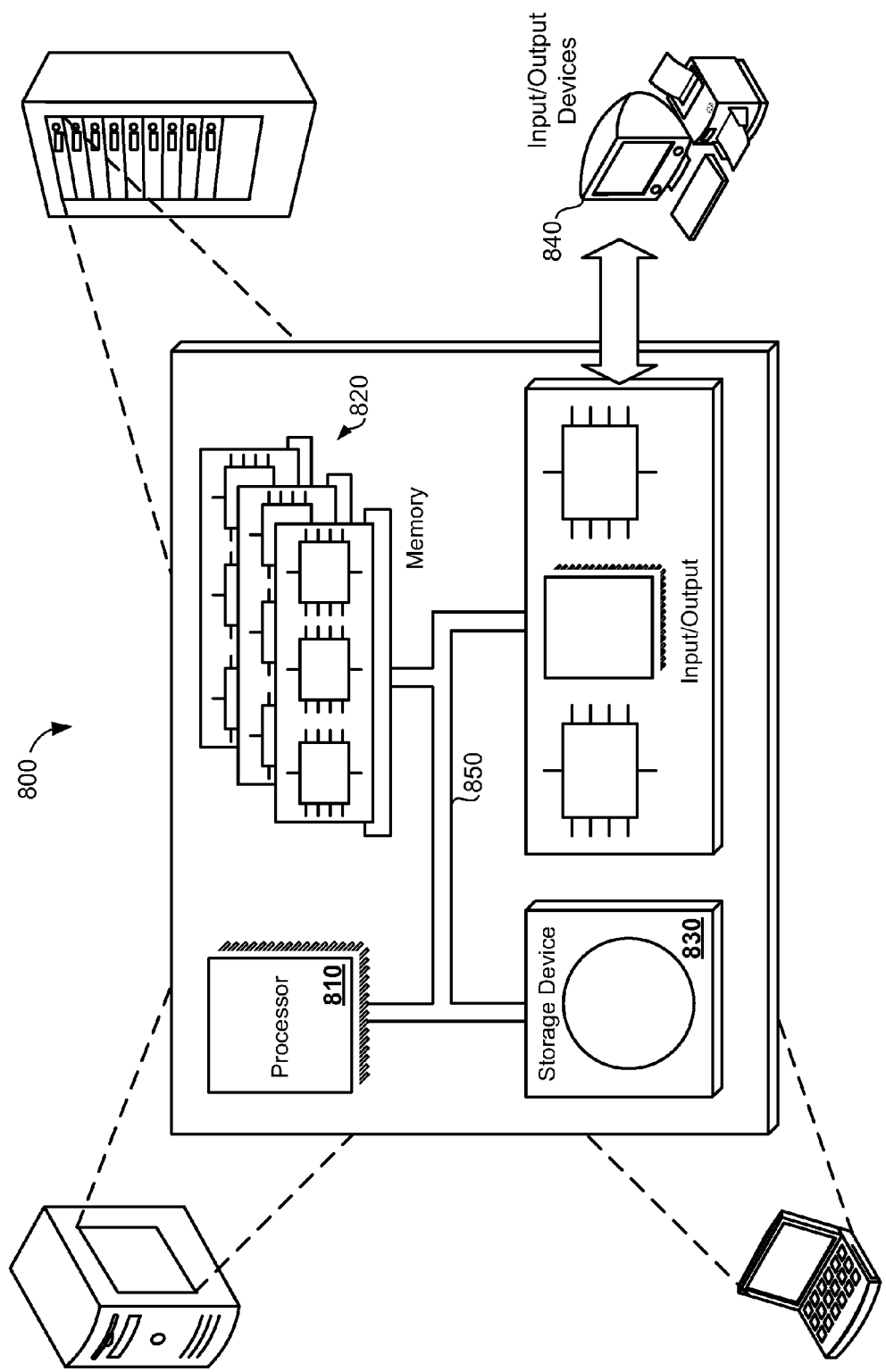
FIG. 8 is a diagram of a generic computer system.

FIG. 8 is a diagram of a generic computer system 800. The process 670 can be run on a system 800. In some implementations, the process 670 can be implemented in hardware as part of the system 800 (e.g., as a graphical processing unit). The system 800 can include a processor 810, a memory 420, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi threaded processor. The processor 810 is capable of processing instructions stored in the memory 820 or on the storage device 830 to display graphical information for a user interface on the input/output device 840.

The memory 820 is a computer readable medium such as volatile or non volatile that stores information within the system 800. The memory 820 can store data structures representing objects, groups of objects and frame buffers, for example. The storage device 830 is capable of providing persistent storage for the system 800. The storage device 830 may be a floppy disk device, a hard disk device, an optical disk device, or a tape device, or other suitable persistent storage means. The input/output device 840 provides input/output operations for the system 800. In one implementation, the input/output device 840 includes a keyboard and/or pointing device. In another implementation, the input/output device 840 includes a display unit for displaying graphical user interfaces. In one implementation, the memory being rendered to is a frame buffer of the display unit.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
receiving, by a computer, a plurality of objects, each object in the plurality of objects being depth-ordered;
partitioning, by the computer, the plurality of objects into groups of two or more objects, each pair of objects in a group of objects sharing a common edge, each group of objects being depth-ordered based on the depth of an object in the group; and
rendering, by the computer, from back to front, each group of objects into a plurality of pixels, each pixel in the plurality of pixels having a respective color value, the rendering including:
selecting a group of objects from the groups of objects;
determining respective first alpha values for first pixels in the plurality of pixels based on coverage of the first pixels by objects in the selected group of objects;
attenuating the respective color value of each of the first pixels based on the respective first alpha values; and
rendering each object in the selected group of objects, including:
selecting an object from the selected group of objects;
determining respective second alpha values for second pixels in the plurality of pixels based on coverage of the second pixels by the selected object; and
adding to the respective color value of each of the second pixels based on the respective second alpha values and one or more color properties associated with the selected object.

2. The method of claim 1, where determining coverage of the first pixels by objects in the selected group of objects includes:
super-sampling each pixel of the first pixels to determine a proportion of each pixel being covered by an object in the selected group; and
storing the proportion as a respective alpha value of each pixel.

3. The method of claim 1, where attenuating the color value of each of the first pixels includes:
multiplying the respective color value of each of the first pixels by one minus the respective first alpha values.

4. The method of claim 3, where multiplying the respective color value of each of the first pixels by one minus the respective first alpha values includes:
adjusting the first alpha values based on a respective transparency property associated with an object in the selected group of objects.

5. The method of claim 1, further comprising:
identifying the first pixels based on an inner boundary area and an outer boundary area of the selected group of objects.

6. The method of claim 1, further comprising:
identifying the second pixels based on an inner boundary area and an outer boundary area of the selected object.

7. The method of claim 6, further comprising:
dynamically adjusting the wide area of the selected group based on changes to the size of the selected group with respect to the plurality of pixels.

8. The method of claim 1, further comprising:
rendering an inside area of each object in the selected group of objects, the inside area corresponding to third pixels in the plurality of pixels, each of the third pixels being completely covered by a single object in the selected group of objects, wherein rendering the inside area comprises blending the respective color values of each of the third pixels based on a respective color property and a respective transparency property of the single object.

9. A computer-implemented method comprising:
receiving a plurality of objects, each object in the plurality of objects being depth-ordered; and
rendering, from back to front, each object into a plurality of pixels, each pixel in the plurality of pixels having a respective color value, the rendering including:
selecting an object from the plurality of objects;
determining respective alpha values for first pixels in the plurality of pixels based on coverage of the first pixels by the selected object;
attenuating the respective color value of each of the first pixels based on the respective alpha values; and
adding to the respective color value of each of the first pixels based on the respective alpha values and one or more color properties associated with the selected object.

10. The method of claim 9, where determining coverage of the first pixels by the selected object includes:
super-sampling each pixel of the first pixels to determine a proportion of each pixel being covered by the selected object; and
storing the proportion as a respective alpha value of each pixel.

11. The method of claim 9, further comprising:
identifying the first pixels based on an inner boundary area and an outer boundary area of the selected object.

12. The method of claim 9, further comprising:
rendering an inside area of each object in the plurality of objects, the inside area corresponding to second pixels in the plurality of pixels being completely covered by the selected object, wherein rendering the inside area comprises blending the respective color values of each of the second pixels based on a respective color property and a respective transparency property of the selected object.

13. The method of claim 9, wherein the attenuating the respective color value of each of the first pixels and adding to the respective color value of each of the first pixels is effected in a single composite blending operation.

14. A computer program product, encoded on a computer-storage medium, operable to cause data processing apparatus to perform operations comprising:
receiving a plurality of objects, each object in the plurality of objects being depth-ordered; and
rendering, from back to front, each object into a plurality of pixels, each pixel in the plurality of pixels having a respective color value, the rendering including:
selecting an object from the plurality of objects;
determining respective alpha values for first pixels in the plurality of pixels based on coverage of the first pixels by the selected object;
attenuating the respective color value of each of the first pixels based on the respective alpha values; and
adding to the respective color value of each of the first pixels based on the respective alpha values and one or more color properties associated with the selected object;
rendering an inside area of each object in the plurality of objects, the inside area corresponding to second pixels in the plurality of pixels being completely covered by the selected object, wherein rendering the inside area comprises blending the respective color values of each of the second pixels based on a respective color property and a respective transparency property of the selected object.

15. The program product of claim 14, where determining coverage of the first pixels by the selected object includes:
super-sampling each pixel of the first pixels to determine a proportion of each pixel being covered by the selected object; and
storing the proportion as a respective alpha value of each pixel.

16. The program product of claim 14, further operable to cause data processing apparatus to perform operations comprising:
identifying the first pixels based on an inner boundary area and an outer boundary area of the selected object.

17. The program product of claim 14, wherein the attenuating the respective color value of each of the first pixels and adding to the respective color value of each of the first pixels is effected in a single composite blending operation.

18. A system comprising:
means for receiving a plurality of objects, each object in the plurality of objects being depth-ordered;
means for partitioning the plurality of objects into groups of two or more objects, each pair of objects in a group of objects sharing a common edge, each group of objects being depth-ordered based on the depth of an object in the group; and
means for rendering, from back to front, each group of objects into a plurality of pixels, each pixel in the plurality of pixels having a respective color value, the rendering including:
selecting a group of objects from the groups of objects;
determining respective first alpha values for first pixels in the plurality of pixels based on coverage of the first pixels by objects in the selected group of objects;
attenuating the respective color value of each of the first pixels based on the respective first alpha values; and
rendering each object in the selected group of objects, including:
selecting an object from the selected group of objects;
determining respective second alpha values for second pixels in the plurality of pixels based on coverage of the second pixels by the selected object; and
adding to the respective color value of each of the second pixels based on the respective second alpha values and one or more color properties associated with the selected object;
means for rendering an inside area of each object in the selected group of objects, the inside area corresponding to third pixels in the plurality of pixels, each of the third pixels being completely covered by a single object in the selected group of objects, wherein rendering the inside area comprises blending the respective color values of each of the third pixels based on a respective color property and a respective transparency property of the single object.

19. The system of claim 18, where determining coverage of the first pixels by objects in the selected group of objects includes:
super-sampling each pixel of the first pixels to determine a proportion of each pixel being covered by an object in the selected group; and
storing the proportion as a respective alpha value of each pixel.

20. The system of claim 18, where attenuating the color value of each of the first pixels includes:
multiplying the respective color value of each of the first pixels by one minus the respective first alpha values.

21. The system of claim 20, where multiplying the respective color value of each of the first pixels by one minus the respective first alpha values includes:
adjusting the first alpha values based on a respective transparency property associated with an object in the selected group of objects.

22. The system of claim 18, further comprising:
means for identifying the first pixels based on an inner boundary area and an outer boundary area of the selected group of objects.

23. The system of claim 18, further comprising:
means for identifying the second pixels based on an inner boundary area and an outer boundary area of the selected object.

24. The system of claim 18, further comprising:
means for dynamically adjusting the wide area of the selected group based on changes to the size of the selected group with respect to the plurality of pixels.

25. A system comprising:
means for receiving a plurality of objects, each object in the plurality of objects being depth-ordered; and
means for rendering, from back to front, each object into a plurality of pixels, each pixel in the plurality of pixels having a respective color value, the rendering including:
selecting an object from the plurality of objects;
determining respective alpha values for first pixels in the plurality of pixels based on coverage of the first pixels by the selected object;
attenuating the respective color value of each of the first pixels based on the respective alpha values; and
adding to the respective color value of each of the first pixels based on the respective alpha values and one or more color properties associated with the selected object means for rendering an inside area of each object in the plurality of objects, the inside area corresponding to second pixels in the plurality of pixels being completely covered by the selected object, wherein rendering the inside area comprises blending the respective color values of each of the second pixels based on a respective color property and a respective transparency property of the selected object.

26. The system of claim 25, where determining coverage of the first pixels by the selected object includes:
super-sampling each pixel of the first pixels to determine a proportion of each pixel being covered by the selected object; and
storing the proportion as a respective alpha value of each pixel.

27. The system of claim 25, further comprising:
means for identifying the first pixels based on an inner boundary area and an outer boundary area of the selected object.

28. The system of claim 25, wherein the attenuating the respective color value of each of the first pixels and adding to the respective color value of each of the first pixels is effected in a single composite blending operation.

* * * * *